US012809319B2

(12) United States Patent
Maurel et al.

(10) Patent No.: US 12,809,319 B2
(45) Date of Patent: Nov. 24, 2026

(54) WATCH WITH CONTROL FOR A DISPLAY BEZEL AND FOR ANOTHER FUNCTIONAL DEVICE

(71) Applicant: The Swatch Group Research and Development Ltd, Marin (CH)

(72) Inventors: Arnaud Maurel, Buttes (CH); Pierpasquale Tortora, Neuchâtel (CH); Jean-Jacques Born, Morges (CH); Cédric Nicolas, Neuchâtel (CH); Baptiste Hinaux, Lausanne (CH)

(73) Assignee: The Swatch Group Research and Development Ltd, Marin (CH)

( * ) Notice: Subject to any disclaimer, the term of this patent is extended or adjusted under 35 U.S.C. 154(b) by 213 days.

(21) Appl. No.: 18/928,559

(22) Filed: Oct. 28, 2024

(65) Prior Publication Data

US 2025/0155849 A1 May 15, 2025

(30) Foreign Application Priority Data

Nov. 14, 2023 (EP) .................................... 23209779

(51) Int. Cl.
*G04B 19/28* (2006.01)
*G04G 21/00* (2010.01)

(52) U.S. Cl.
CPC ........... *G04G 21/00* (2013.01); *G04B 19/283* (2013.01)

(58) Field of Classification Search
CPC .... G04G 21/00; G04B 19/283; G04B 19/286; G04B 47/061; G04B 19/18
See application file for complete search history.

(56) References Cited

U.S. PATENT DOCUMENTS

| | | | | | |
|---|---|---|---|---|---|
| 995,457 | A * | 6/1911 | Hansell | G04B 19/283 368/232 |
| 3,190,022 | A * | 6/1965 | Maitre | G04B 19/241 368/10 |
| 3,431,722 | A * | 3/1969 | Haas | G04B 47/061 968/211 |
| 3,665,701 | A * | 5/1972 | Burdet | G04B 19/28 968/212 |

FOREIGN PATENT DOCUMENTS

| | | | |
|---|---|---|---|
| EP | 0310007 | A1 | 4/1989 |
| JP | H04-361192 | A | 12/1992 |

OTHER PUBLICATIONS

European Search Report of No. 23209779.0 dated Apr. 3, 2024.

* cited by examiner

*Primary Examiner* — Sean Kayes
(74) *Attorney, Agent, or Firm* — Sughrue Mion, PLLC

(57) ABSTRACT

A watch (100) including a middle (50) carrying a display bezel (10) and a control bezel (20) accessible to a user for operation and rotatable in a first direction of rotation and in a second direction of rotation opposite to the first, and able to drive the display bezel (10) solely in the first direction of rotation, via a one-way drive mechanism of the display bezel, under the action of a rotational motion imparted by a user to the control bezel (20) in the first direction of rotation, the watch further including another movable member in addition to the display bezel, and the control bezel (20) further being arranged to be able to drive the movable member (30) under the action of a rotational motion imparted by a user to the control bezel (20) in the second direction of rotation. The movable member is advantageously located inside the watch.

20 Claims, 8 Drawing Sheets

WATCH WITH CONTROL FOR A DISPLAY BEZEL AND FOR ANOTHER FUNCTIONAL DEVICE

CROSS REFERENCE TO RELATED APPLICATIONS

This application is claiming priority based on European Patent Application No. 23209779.0 filed on Nov. 14, 2023.

TECHNICAL FIELD OF THE INVENTION

The invention relates to a watch comprising a middle carrying a two-way control bezel and a display bezel arranged in such a way as to be able to be driven rotatably by the control bezel solely in a first direction of rotation, relative to said middle, under the action of a rotational motion imparted by a user to the control bezel in said first direction of rotation. The invention relates in particular to diving watches.

TECHNOLOGICAL BACKGROUND

Many commercially-available mechanical or smart watches are equipped with functions that can be activated or operated by turning a bezel, particularly a control bezel.

For certain watches, such as diving watches, the combination of the position of the display bezel and the rest of the display informs the user of the time remaining before proceeding with safety operations, and as a result the display bezel can only rotate in one direction, to display either conservative or accurate information. To ensure safety, irreversible fastening is not always possible, and there is a need to reconcile a high level of resistance to external stresses with reversible fastening, which may be necessary in order to maintain the object, or to modify its appearance.

SUMMARY OF THE INVENTION

The purpose of the invention is to allow the user of a watch, in particular the user of a diving watch, to operate a display bezel in a single direction of rotation as well as to activate or adjust a functional device inside the watch by rotating a control bezel, in particular but not exclusively equipped with magnetic transmission means, without affecting the water-resistance of the watch.

To this end, the invention relates to a watch comprising a middle carrying a display bezel and a control bezel coaxial with the display bezel and accessible to a user for operation, the control bezel being rotatable in a first direction of rotation and in the second direction of rotation opposite to the first direction of rotation, and being arranged so as to be able to drive the display bezel solely in said first direction of rotation, via a one-way drive mechanism of the display bezel, under the action of a rotational motion imparted by a user to the control bezel in the first direction of rotation. According to the invention, the watch further comprises another movable member in addition to the display bezel, and the control bezel is arranged to be able to drive said movable member under the action of a rotational motion imparted by a user to the control bezel in the second direction of rotation.

According to an advantageous feature, the display bezel is arranged so as to be rotatable only in said first direction of rotation relative to said middle by means of a first click mechanism arranged between said middle and the display bezel.

According to another advantageous feature, said one-way drive mechanism for the display bezel is formed by a second click mechanism.

According to a main embodiment, the movable member is housed inside the middle and protected sealingly by the middle.

According to an advantageous embodiment, the control bezel is arranged to drive the movable member by means of contactless transmission means formed by magnetic transmission means, the control bezel or the movable member comprising magnets arranged to cooperate with magnets or at least one ferromagnetic mass comprised in the movable member or respectively the control bezel, so as to allow the movable member to be driven in a contactless manner by the control bezel by way of the middle.

According to a preferred embodiment, the watch is arranged so that the control bezel can drive said movable member solely by said rotational motion in said second direction of rotation.

In an embodiment combining the above-mentioned advantageous embodiment and preferred embodiment, the watch comprises a third click mechanism arranged between said movable member and a part integral with the middle, or the middle, so as to prevent the movable member from being driven during a rotational motion of the control bezel in said first direction of rotation.

In a particular embodiment, the control bezel is arranged to drive the movable member by means of one-way mechanical transmission means, which comprise either a click mechanism or an upstream disconnectable mechanism arranged upstream of the movable member so as to allow this movable member to be driven solely by said rotational motion of the control bezel in said second direction of rotation.

BRIEF DESCRIPTION OF THE FIGURES

The purposes, advantages and features of the invention will be better understood upon reading the following detailed description given with reference to the accompanying drawings, in which.

DETAILED DESCRIPTION OF THE INVENTION

Figure 1:
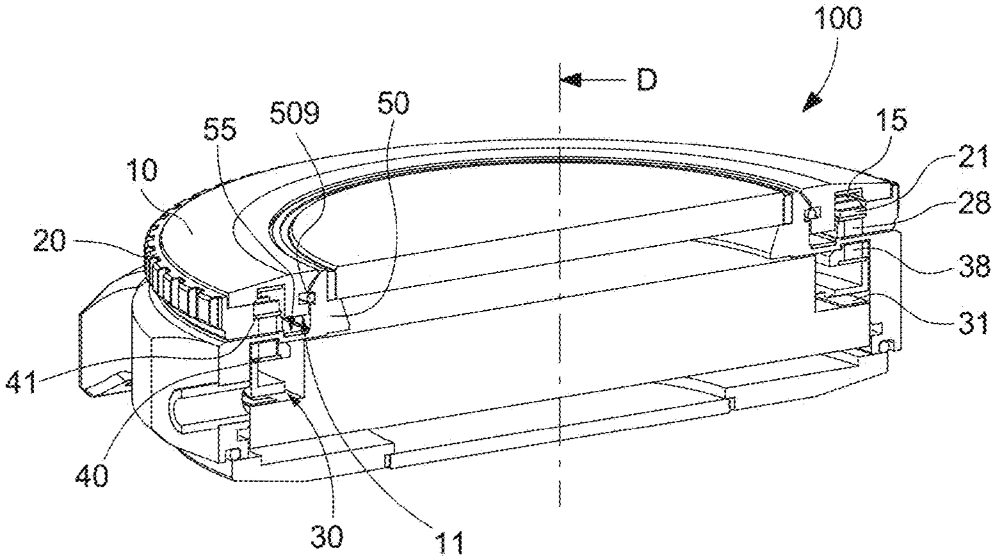
FIG. 1 diagrammatically illustrates a perspective, sectional view through a radial plane passing through an axis of rotation of the bezels, of a watch according to the invention, the middle whereof carries two external bezels, namely a display bezel which can only be controlled indirectly by a control bezel operated by a user, and inside which watch a movable member, in this case taking the form of an inner ring, inaccessible directly from outside the watch, can be controlled indirectly by the control bezel, by means of a transmission, which in this alternative embodiment is a magnetic transmission; in this figure, two rings of magnets are coaxial, one integral with the control bezel, the other with the movable member.
Figure 3:
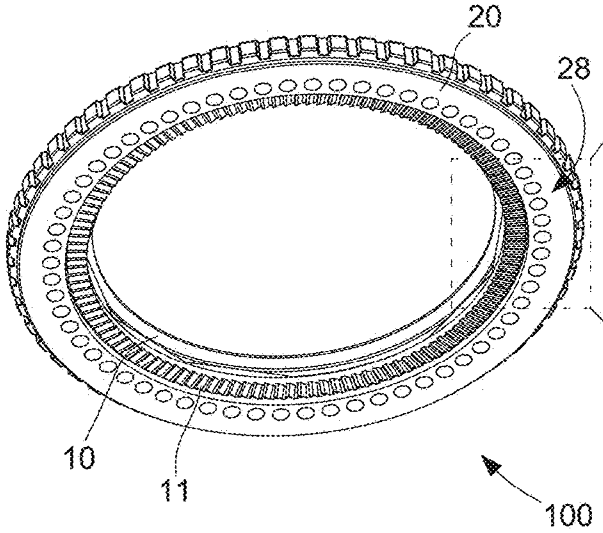
FIG. 3 diagrammatically shows a perspective view from the inside of the watch, without the middle, the display bezel and the control bezel.

The invention relates to a timepiece, more particularly a watch 100, even more particularly a diving watch. This watch 100 comprises a middle 50, which carries a display bezel 10 that is rotatable at least in a single anti-clockwise direction of rotation S1 relative to the middle 50.

The watch 100 comprises a control bezel 20, coaxial with the display bezel 10, and accessible to a user for operation. This control bezel 20 is movable in the first direction of rotation S1 and in a second direction of rotation S2 opposite to the first direction of rotation S1, and is arranged so as to drive the display bezel 10 only in the first direction of rotation, through a one-way drive mechanism of the display bezel 10, under the action of a rotational motion imparted by a user to the control bezel 20 in the first direction of rotation S1. The watch 100 further comprises another movable member 30 in addition to the display bezel 10, and the control bezel 20 is arranged to be able to drive this movable member 30 under the action of a rotational motion imparted by a user to the control bezel 20 in the second direction of rotation S2.

Advantageously, the display bezel 10 is arranged so as to be rotatable only in the first direction of rotation S1 relative to the middle 50 by means of a first click mechanism arranged between this middle 50 and the display bezel. The display bezel is held axially in place by means of a circular spring 509.

According to another advantageous feature, the one-way drive mechanism for the display bezel 10 is formed by a second click mechanism arranged between the control bezel and the display bezel.

Preferably, the movable member 30 is housed inside the middle 50 and protected sealingly by the middle 50.

More particularly, the watch 100 comprises, inside the middle 50 and thus protected sealingly by the middle 50, the movable member 30 which is coaxial with the control bezel 20 and with the display bezel 10, and which is movable through a one-way rotational motion in the second direction of rotation. Moreover, the control bezel 20 is arranged to drive the movable member 30 in the second direction of rotation. More particularly, in an alternative embodiment illustrated in FIG. 1, the movable member 30 is an inner ring coaxial with the control bezel 20 and with the display bezel 10.

More particularly, and as can be seen in FIGS. 1 and 7 to 9, the control bezel 20 is externally coaxial with the display bezel 10, and is arranged to laterally protect the display bezel 10.

The control bezel 20 is arranged to drive the movable member 30 via transmission means which are mechanical transmission means or contactless transmission means.

Even more particularly, and as can be seen in particular in FIGS. 1 and 6 to 9, the control bezel 20 is arranged to drive the movable member 30 by means of contactless transmission means formed by magnetic transmission means, the control bezel 20 or the movable member 30 comprising magnets arranged to cooperate with magnets or at least one ferromagnetic mass comprised in the movable member 30 or respectively the control bezel 20, so as to allow the movable member 30 to be driven in a contactless manner by the control bezel 20 by way of the middle 50. These magnetic transmission means are advantageous for ensuring that the watch is water-resistant.

More specifically, the movable member 30 comprises internal magnets 38 which are separated by the middle 50 from at least one external ferromagnetic mass or external magnets 28 comprised in the control bezel 20.

More particularly, the control bezel 20 is arranged to drive the movable member 30 in at least the second direction of rotation under the effect of the magnetic cooperation between the movable member 30 and the control bezel 20, more particularly between the internal magnets 38 and the external magnets 28 when the movable member 30 and the control bezel 20 both comprise magnets, as illustrated by FIGS. 1 to 4 and 7 to 12. The watch 100 thus comprises a control bezel 20 with magnetic transmission for the internal movable member and a double click system for one-way mobility of the display bezel and its driving in the first direction of rotation.

The present invention is thus based, in this embodiment, on a watch control bezel 20 concept allowing motion to be transmitted inside the watch 100 by magnetism, in particular in both directions of rotation or in one direction only, and which does not disrupt the display of a display bezel 10 when the user operates the control bezel 20 in the clockwise direction (second direction of rotation).

In a particular embodiment, illustrated by the figures, when the user wishes to adjust the display bezel 10, which carries or comprises a first click 15, as seen in FIG. 1, the user operates the control bezel 20 in the first anti-clockwise direction S1, the external bezel 20 carrying or comprising a second notching 21, which makes it possible to transmit the rotation of the control bezel 20 to the display bezel 10.

In the present description, “comprise” must be understood to mean a one-piece component, for example a bezel, in which a particular profile such as a toothing is machined, and “carry” must be understood to mean a component which carries another component, for example a bezel carrying an attached toothed ring.

The middle 50 carries or comprises a middle click 55, which is arranged to cooperate with a first notching 11 carried or comprised in the display bezel 10. This middle click 55, which is reversed relative to the first click 15, slides relative to the middle 50 and allows the display bezel 10 to rotate in the first direction of rotation. As the control bezel 20 is integral with magnets, it allows for magnetic transmission with the movable member 30, to activate a function inside the watch 100 without affecting the water-resistance thereof.

When the user wishes to activate the function, particularly underwater, without adjusting the display bezel 10, the user turns the control bezel 20 clockwise, with the first click 15 becoming sliding, thus allowing the control bezel 20 to continue turning, the middle click 55 (mounted in the opposite direction to the first click 15) blocking the rotation of the display bezel 10 relative to the middle 50, and thus preventing the display from being disrupted while allowing the control bezel 20 to rotate clockwise (second direction of rotation). This operation can be used, for example, to trigger a light function, start a repeater, or any other function contained in the watch.

Various arrangements can be used for the magnetic masses.

Figure 6:
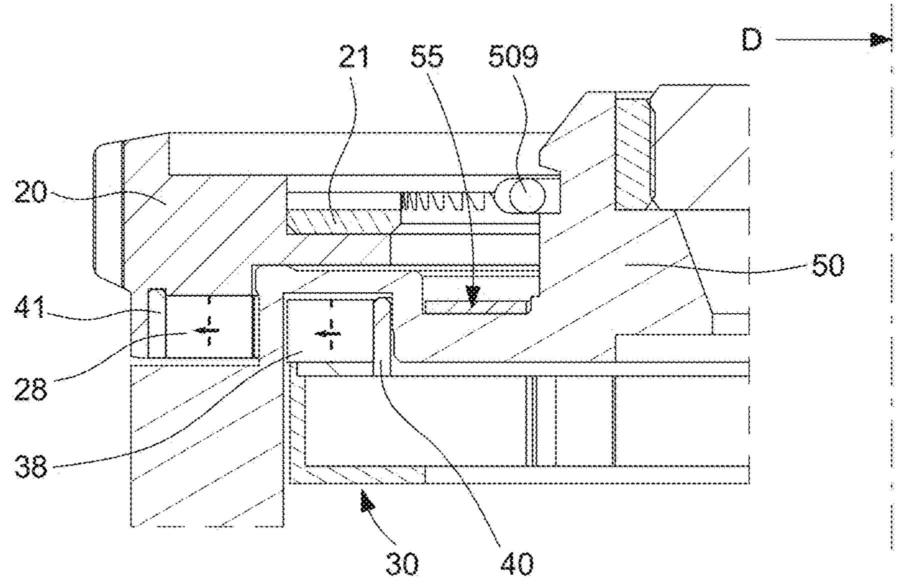
FIG. 6 diagrammatically shows a sectional view of the middle sealingly enclosing the movable member, and of the control bezel, with the rings of magnets of the control bezel and of the movable member in a coplanar configuration, which view is taken along a plane passing through the axis of rotation of the control bezel.
Figure 7:
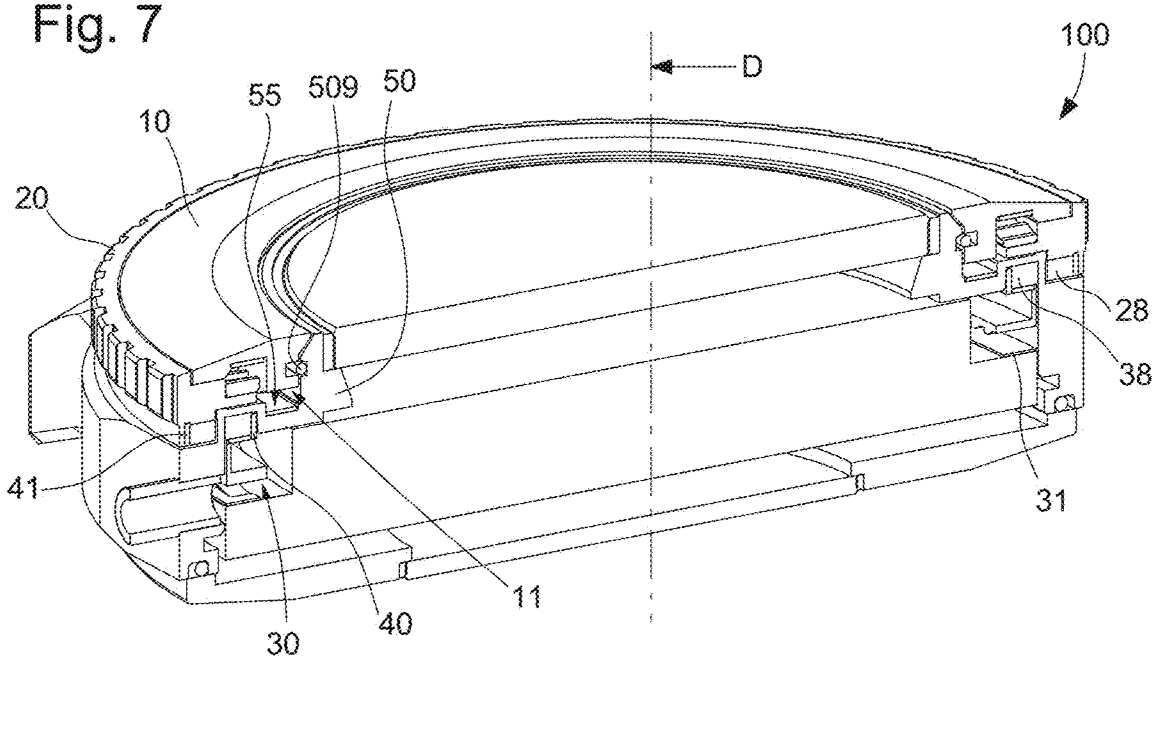
FIG. 7 shows, similarly to FIG. 1, the same alternative embodiment with the coaxial rings of magnets of the control bezel and of the movable member in a radial configuration, in the case of rotation of the control bezel in the first anti-clockwise direction.

In a first arrangement, visible in FIGS. 6 and 7, the movable member 30 is arranged so that it can rotate; the internal magnets 38, on the one hand, and the external magnets 28 or the at least one external ferromagnetic mass, on the other hand, are arranged in two rings that are substantially coplanar and concentric relative to a common axis of rotation D about which the control bezel 20 and the movable member 30 can rotate.

Figure 2:
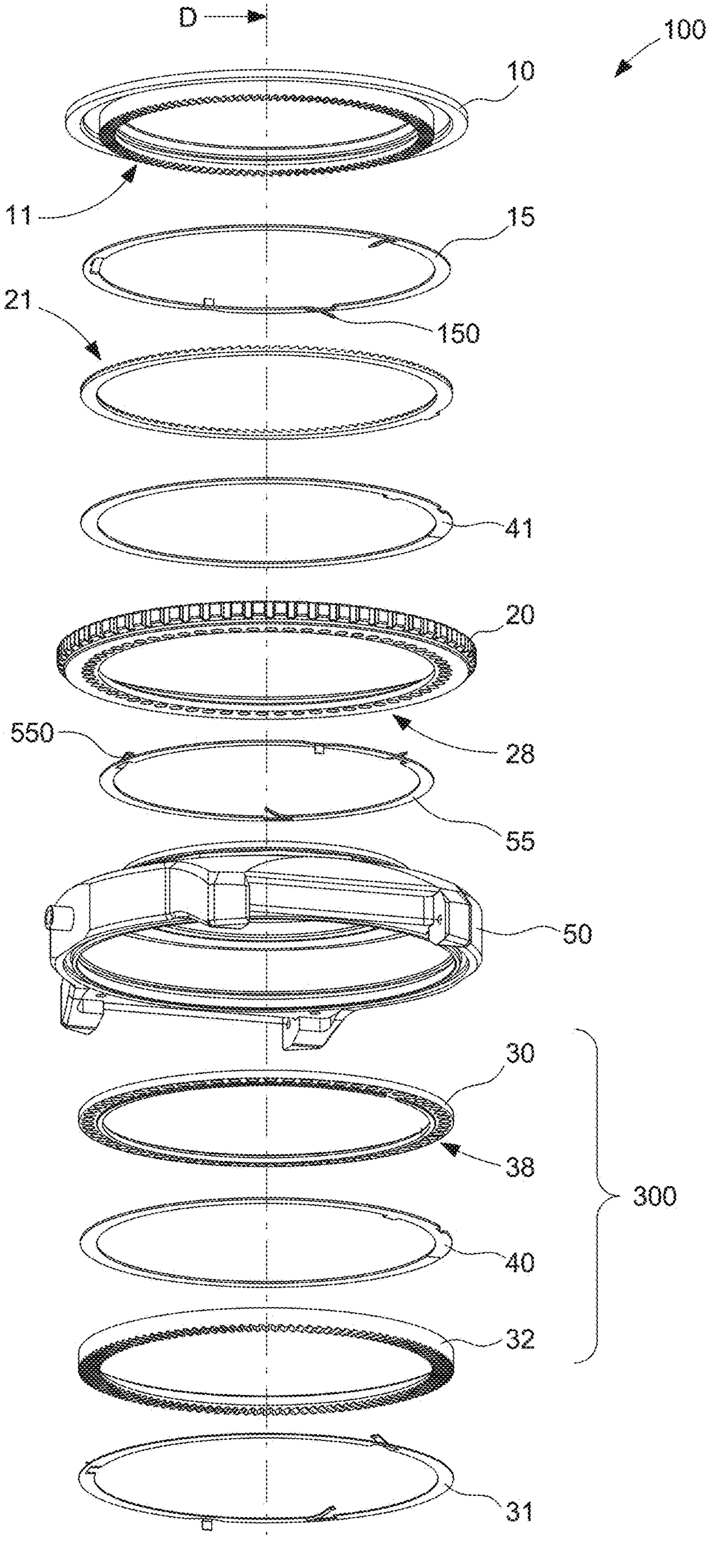
FIG. 2 diagrammatically shows a perspective, exploded view, without the back of the watch, of the stacking of the components visible in FIG. 1.
Figure 5:
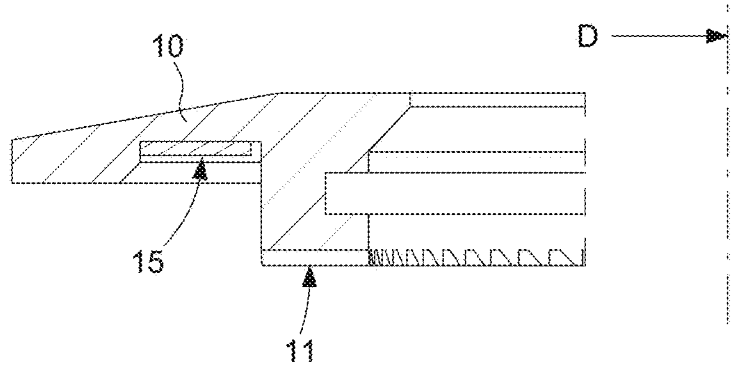
FIG. 5 diagrammatically shows a sectional view of the display bezel, which view is taken along a plane passing through the axis of rotation of the control bezel.

Thus, the internal magnets 38, on the one hand, and the external magnets 28 or the at least one external ferromagnetic mass, on the other hand, are arranged in two substantially coplanar rings, coaxial in relation to the common axis of rotation D of the control bezel 20 and of the display bezel 10; in the particular and non-limiting case of FIGS. 6 and 7, the axis D is also the axis of rotation of the movable member 30. This radial configuration, in which the magnetic field lines are perpendicular to the axis of rotation D of the bezels, is advantageous because friction is compensated for by the magnets located on the other side of the perimeters of the internal and external bezels. FIG. 2 shows a sub-assembly 300, formed by the movable member 30 with the lower magnets 38, a magnetic field closing plate 40, and a notched ring 32, which cooperates with an internal click 31.

Figure 8:
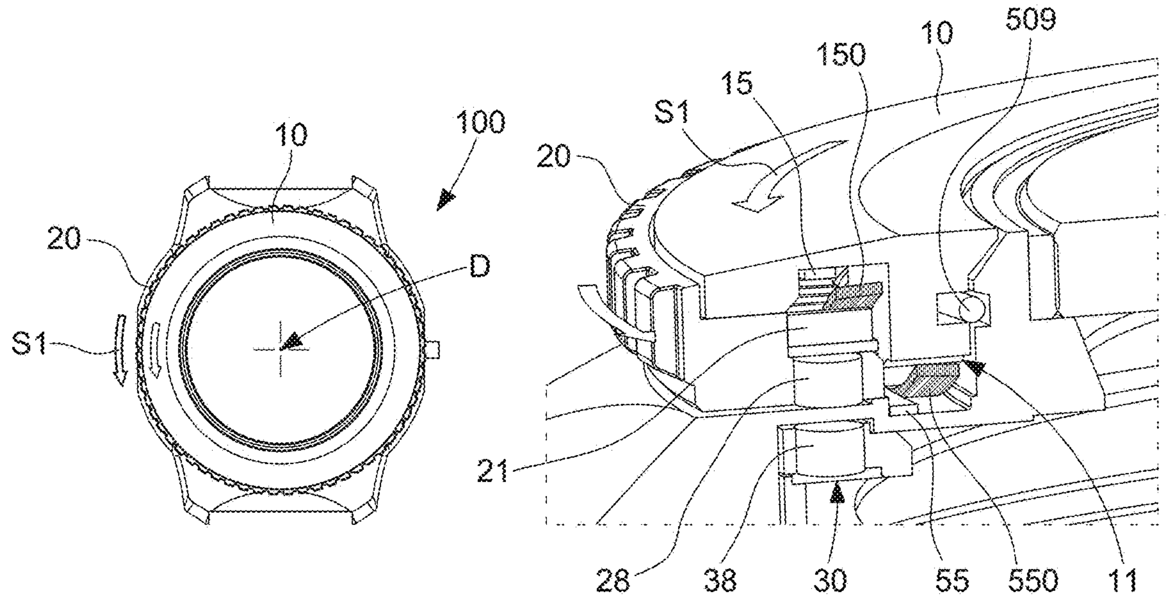
FIG. 8 shows the watch in plan view, as seen by the user, and a perspective, sectional view thereof through a radial plane passing through an axis of rotation of the bezels, in the alternative embodiment shown in FIG. 7; the notching of the control bezel is blocked by the catches of a front click carried by the display bezel, whereas the first front notching of the display bezel is not impeded by a front middle click carried by the middle.
Figure 9:
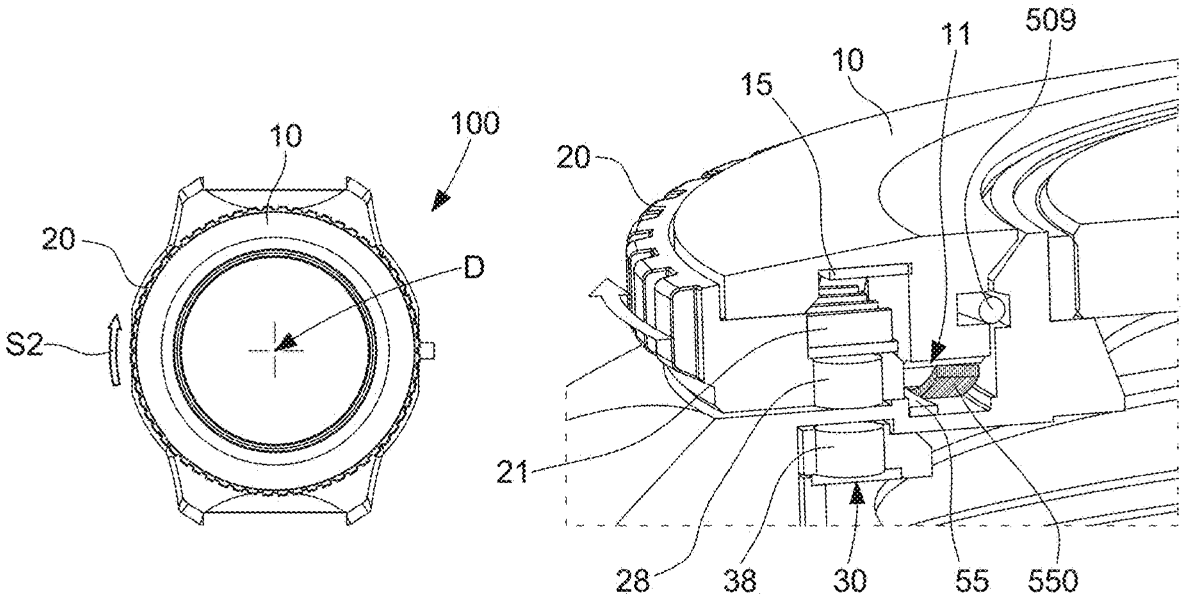
FIG. 9, similarly to FIG. 8, shows the same mechanism, with the control bezel rotating in a second direction opposite to the first direction: it can be seen that the notching of the control bezel is not impeded by the catches of the front click of the display bezel, whereas the first front notching of the display bezel is impeded by the catches of the front middle click carried by the middle.

In a second arrangement, visible in FIGS. 1, 8 and 9, the movable member 30 is arranged so that it can rotate; and the internal magnets 38, on the one hand, and the external magnets 28 or the at least one external ferromagnetic mass, on the other hand, are arranged in two rings that are parallel and stacked in the direction of a common axis of rotation D about which the control bezel 20 and the movable member 30 can rotate. In the particular and non-limiting case of FIGS. 1, 8 and 9, the axis D is also the axis of rotation of the movable member 30.

The external magnets 28 of the control bezel 20 can be above the internal magnets 38 of the movable member 30, in which case the magnetic field lines are parallel to the axis of rotation D of the bezels. However, friction between the movable member 30 and the middle 50 and between the control bezel 20 and the middle increases with the number of magnets, and the friction forces can be of the same order of magnitude as the magnetic forces.

Figure 4:
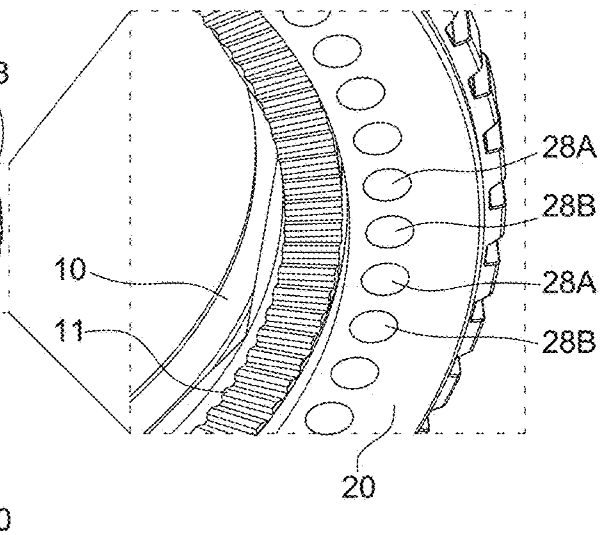
FIG. 4 is a close-up view of that shown in FIG. 3, showing the alternating polarities of the magnets comprised in a ring of external magnets integral with the control bezel.

In particular, and as can be seen in FIG. 4, on the same ring of magnets, in this case a ring carrying the external magnets 28, these magnets are of alternating polarity 28A and 28B; it goes without saying that the internal magnets 38 therefore have a similar arrangement. This produces magnetic notching.

By way of example, for a diving wristwatch, the use of 28 magnets per bezel (cylinders of diameter 1.3 mm and height 0.85 mm) over a diameter of approximately 38 mm, with an air gap of 0.45 mm, and magnetic field closing plates 40 and 41 made of AFK sheet metal with a thickness of 0.2 mm, allows a torque of 32 mNm to be transmitted between the control bezel 20 and the movable member 30, which is sufficient to trigger a watch function in complete safety.

In the particular case where the control bezel 20 or the movable member 30 comprises at least one ferromagnetic mass, an advantageous arrangement, not illustrated, relates to a movable member comprising at least one ferromagnetic mass in the form of a toothed ring, the number of teeth whereof is equal to a number of magnetic pitches that the movable member 30 or the control bezel 20 respectively comprises, or is an integer multiple of this number of magnetic pitches.

More particularly, the control bezel 20 comprises at least one ferromagnetic mass in the form of such a toothed ring, the number of teeth of which is equal to a number of magnetic pitches that the movable member 30 comprises, or to an integer multiple of this number of pitches.

Advantageously, the watch 100 is arranged so that the control bezel 20 can drive the movable member 30 solely by the rotational motion in the second direction of rotation.

Even more particularly, in an alternative embodiment in which the control bezel 20 is arranged to drive the movable member 30 via contactless transmission means formed by magnetic transmission means, and in which the watch 100 is arranged so that the control bezel 20 can drive the movable member 30 solely by rotational motion in the second direction of rotation (clockwise), the watch 100 comprises a third click mechanism arranged between the movable member 30 and a part integral with the middle 50, or the middle 50, so as to prevent the movable member 30 from being driven during a rotational motion of the control bezel 20 in the first direction of rotation.

More particularly, the movable member 30 is movable in a single direction of rotation, namely the second direction of rotation, and comprises a notching or a click arranged to cooperate respectively with a click or a notching carried by or comprised in the middle 50 or a plate 60 of the watch 100, which notching and click constitute this third click mechanism. More particularly still, the movable member 30 comprises a notching arranged to cooperate with an internal click 31 carried by or comprised in the middle 50 or a plate 60 of the watch 100.

Figure 13:
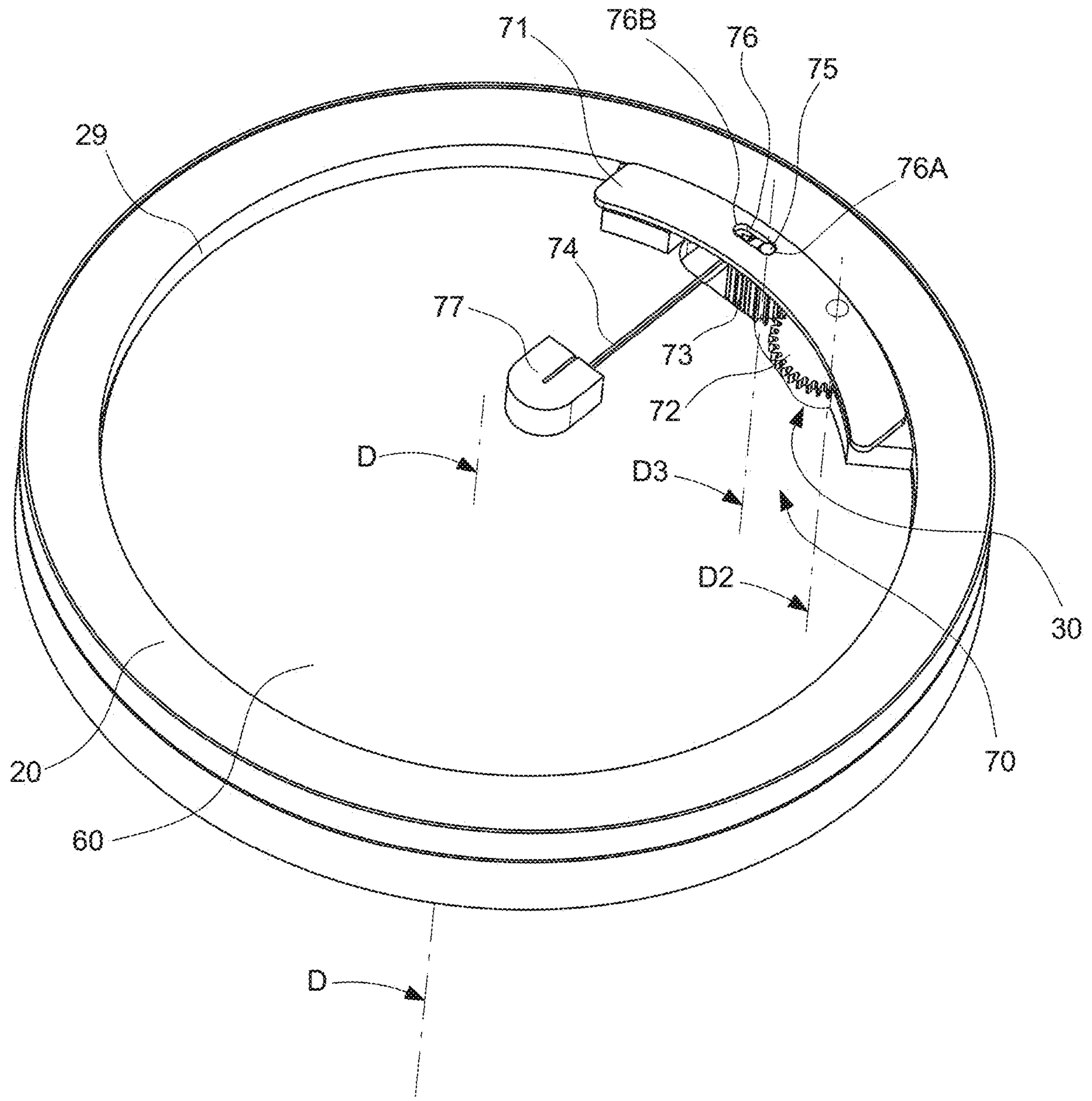
FIG. 13 shows, similarly to FIG. 10, another alternative embodiment with a mechanical transmission wherein the control bezel directly carries an internally-toothed transmission wheel, and cooperates with a disconnecting mechanism similar to that of FIG. 10 for locking or driving a wheel that is offset from the common axis of the bezels, this offset wheel thus constituting the movable member or a direct drive member of the movable member.
Figure 14:
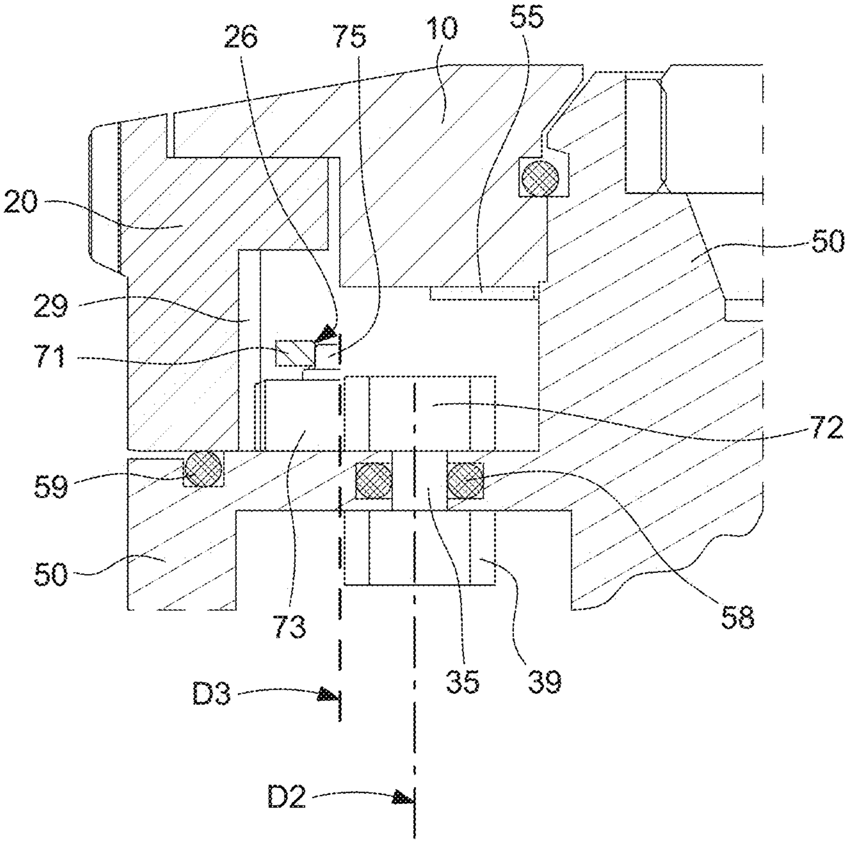
FIG. 14 shows a partial, close-up, sectional view of the mechanism in FIG. 10 or of that in FIG. 13, taken along two levels, on the one hand in the left-hand part of the figure passing through the axis of rotation of the pinion, and on the other hand in the right-hand part of the figure passing through the axis of rotation of the offset wheel.
Figure 15:
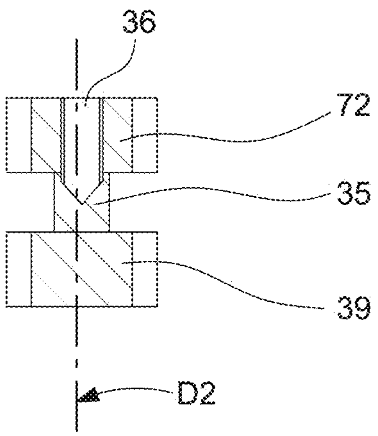
FIG. 15 shows a sectional view, taken through its axis of rotation, of the offset wheel in FIGS. 13 and 14, which can also be suitable for the alternative embodiment in FIGS. 10 to 12, comprising an upper wheel above a plate and capable of being driven by the pinion, linked by an arbor sealed by at least one seal to a lower wheel housed in a sealed chamber of the watch.

In particular, and whatever the nature of the transmission means between the control bezel 20 and the movable member 30, the control bezel 20 is arranged to drive the movable member 30 by means of one-way mechanical transmission means, which comprise either a click mechanism or an upstream disconnectable mechanism 70 arranged upstream of the movable member 30 so as to allow this movable member 30 to be driven solely by the rotational motion of the control bezel 20 in the second direction of rotation S2. Moreover, and more particularly still, as can be seen in FIG. 13, the control bezel 20, which rotates about an axis of rotation D, comprises, coaxially, an internally-toothed transmission wheel 29 which is arranged to drive the movable member 30 by means of an upstream disconnectable mechanism 70 arranged for the one-way driving of an offset wheel 72, which constitutes or drives the movable member 30 and which is offset relative to the axis of rotation D, under the action of a pinion 73, also offset relative to the axis of rotation D and permanently engaging with the internally-toothed transmission wheel 29 and held guided in an oblong groove 76 made in a fixed bridge 71, which oblong groove is coaxial with the axis of rotation D, between extreme stop positions 76A and 76B, the pinion 73 being arranged to engage with the offset wheel 72 when the control bezel 20 rotates in the second direction of rotation, and to disengage from the offset wheel 72 when the control bezel 20 rotates in the first direction of rotation. FIGS. 14 and 15 illustrate details of this alternative embodiment, with a particular embodiment in which the offset wheel 72 with mechanical transmission is housed in an upper space between the watch crystal and a flat surface of the middle 50, or of a plate 60, comprised in the watch 100, and is arranged to drive a lower wheel 39 located under this flat section, on the opposite side to the offset wheel 72, which is arranged to pivot above the middle 50 or the plate 60 and is capable of being driven by the pinion 73. The offset wheel 72 is connected by an arbor 35 sealed by at least one seal 58 to this lower wheel 39 housed in a sealed chamber of the watch, coaxial along the axis of rotation D2 of the offset wheel 72, the assembly being produced by a square 36.

In particular, in the various alternative embodiments illustrated in FIGS. 1, 2 and 6 to 12, the movable member

30 is a ring inside the middle 50 and coaxial with the control bezel 20 and with the display bezel 10.

When the display bezel 10 is arranged so as to be rotatable only in the first direction of rotation S1 relative to the middle 50 via a first click mechanism arranged between the middle 50 and the display bezel 10, the display bezel 10 advantageously comprises a notching or a click, arranged to cooperate respectively with a click or a notching carried by or comprised in said middle 50, which notching and click constitute this first click mechanism, and are combined and arranged together to prevent rotation of the display bezel 10 in the second direction of rotation. More particularly still, and as can be seen in FIGS. 1, 7, 8 and 9, the display bezel 10 comprises a first front notching 11, which is arranged to cooperate with a front middle click 55 carried by or comprised in the middle 50.

When the one-way drive mechanism of the display bezel 10 is formed by a second click mechanism, the control bezel 20 advantageously comprises a notching or a click arranged to cooperate respectively with a click or a notching comprised in the display bezel 10, which notching and click constitute said second click mechanism, and are combined and arranged together to impose a single driving direction for the display bezel 10 by the control bezel 20. More particularly, the control bezel 20 comprises a second notching 21, which is arranged to cooperate with a first front click 15 carried by or comprised in the display bezel 10, which comprises catches 150. More particularly still, this second notching 21 is arranged to cooperate with the first click 15 in the opposite direction to the middle click 55 of the first click mechanism, which middle click 55 comprises catches 550.

In another alternative embodiment, and whatever the nature of the transmission means between the control bezel 20 and the movable member 30, the control bezel 20 is arranged to drive the movable member 30 via two-way mechanical transmission means. Moreover, the movable member 30, arranged so as to be able to rotate about an axis of rotation D, is arranged so as to be able to operate and/or control a downstream mechanical device, located downstream of the movable member 30 in the watch 100, via a downstream disconnectable mechanism 700 or a downstream click mechanism which is arranged so that the movable member 30 can operate and/or control the downstream mechanical device solely by the rotational motion imparted by a user to the control bezel 20 in the second direction of rotation.

In yet another alternative embodiment, and in the case of contactless transmission means between the control bezel 20 and the movable member 30, the movable member 30, arranged so as to be able to rotate about an axis of rotation D, is arranged so as to be able to operate and/or control a downstream mechanical device, located downstream of the movable member 30 in the watch 100, via a downstream disconnectable mechanism 700 or a downstream click mechanism which is arranged so that the movable member can operate and/or control this downstream mechanical device solely by the rotational motion imparted by a user to the control bezel 20 in the second direction of rotation.

Figure 10:
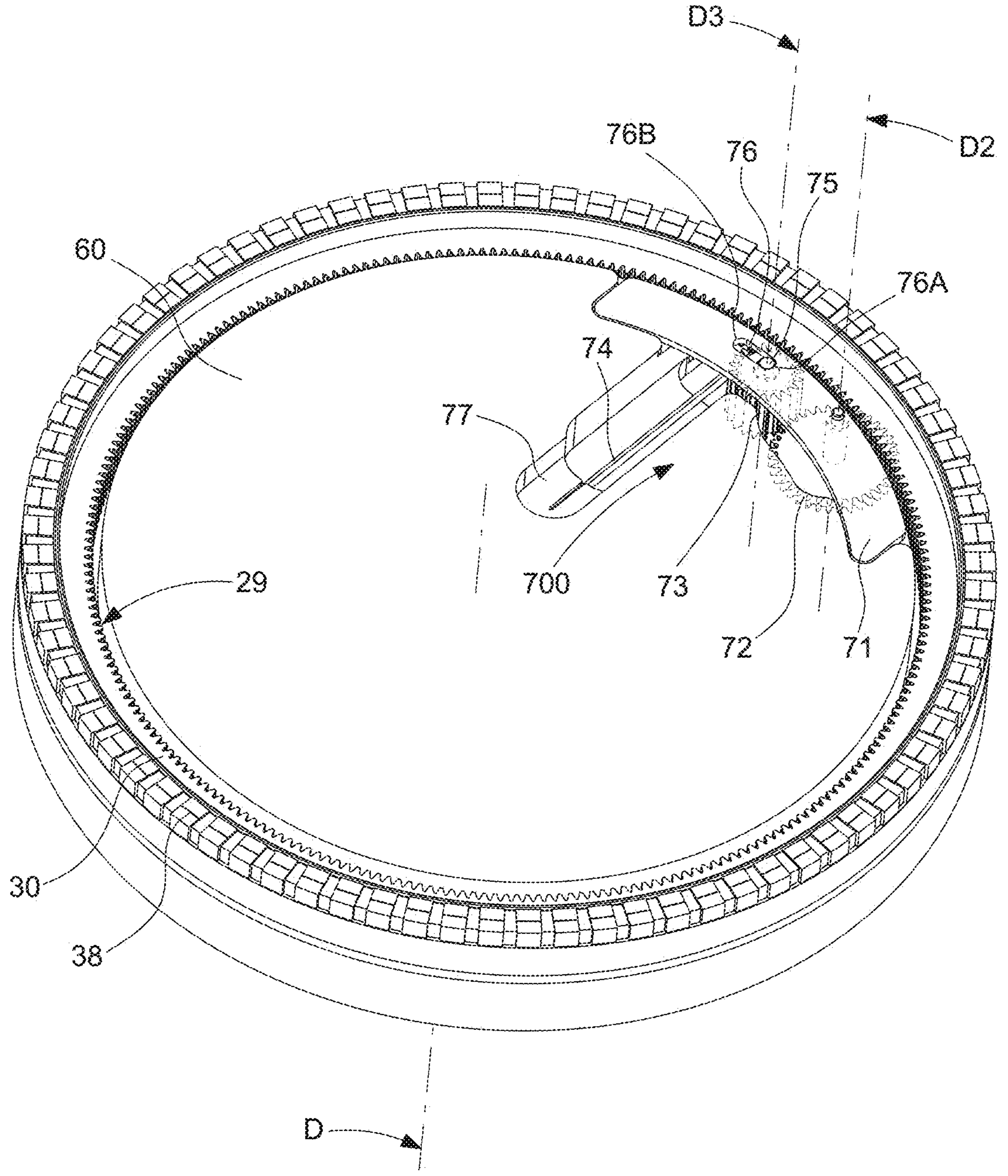
FIG. 10 shows a perspective view of an alternative embodiment wherein the movable member, shown with its ring of lower magnets and an internally-toothed transmission wheel, cooperates with a disconnecting mechanism for locking or driving a wheel that is offset from the common axis of the bezels: this offset wheel is guided between a plate and a bridge; a pinion comprises a trunnion movable in an oblong aperture in this bridge, it cooperates with the toothed transmission wheel, and tends to be brought back towards the offset wheel by a strip spring embedded in the plate; this pinion is shown here in the position wherein it engages with the offset wheel, which itself controls another function inside the watch.
Figure 11:
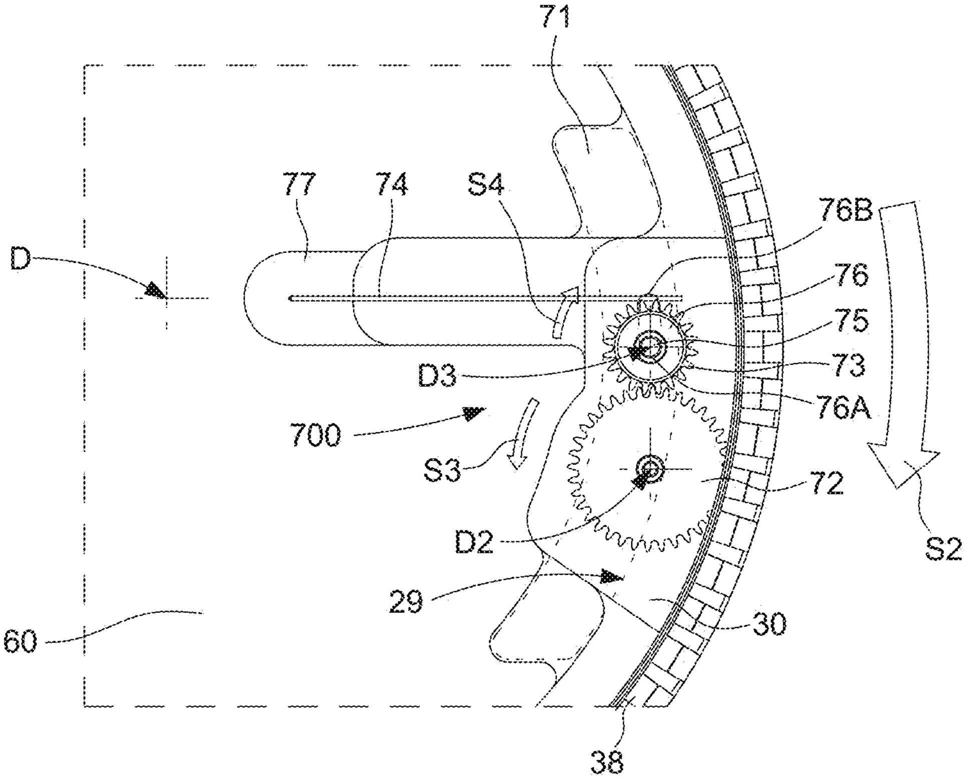
FIG. 11 shows, from above, a close-up view of the engagement between the pinion and the offset wheel; when the movable member rotates in the second direction, the pinion rotates in the second direction and the offset wheel rotates in the first direction.
Figure 12:
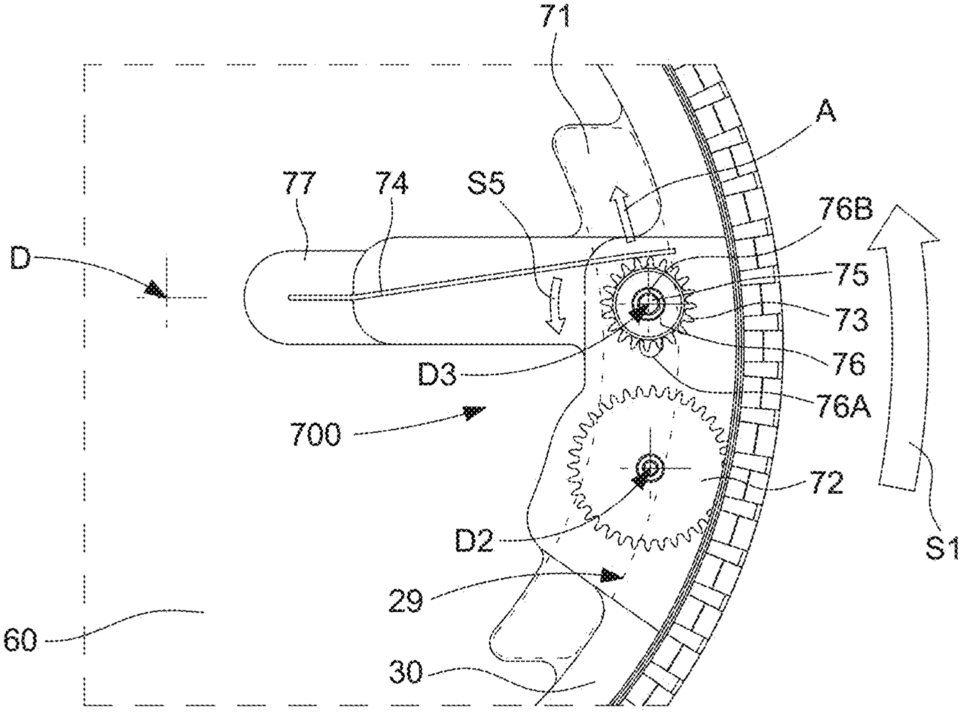
FIG. 12 shows the opposite case to that of FIG. 11, with a close-up view of the disengagement between the pinion and the offset wheel; when the movable member rotates in the first direction, the pinion rotates in the first direction and moves away from the offset wheel, and the offset wheel, which is not driven, remains stationary.

In either of these two alternative embodiments wherein the movable member 30 is arranged to be able to operate and/or control a downstream mechanical device, via a downstream disconnectable mechanism 700 or a downstream click mechanism, advantageously this downstream mechanical device is arranged to be operated and/or controlled by the movable member 30, which comprises an internally-toothed transmission wheel 29, via the downstream disconnectable mechanism 700 which comprises an offset wheel 72 and a pinion 73, both offset relative to the axis of rotation D, the movable pinion 73 of axis of rotation D3 permanently engaging with the internally-toothed transmission wheel 29 and being held guided in an oblong groove 76 comprised in a fixed bridge 71, which oblong groove is coaxial with the axis of rotation D, between extreme stop positions 76A and 76B, the pinion 73 being arranged to engage with the offset wheel 72, which is rotatable about a fixed axis of rotation D2, when the control bezel 20 rotates in the second direction of rotation, and to disengage from the offset wheel 72 when the control bezel 20 rotates in the first direction of rotation. FIGS. 10 to 12 illustrate such an alternative embodiment in which the movable member 30, shown with its ring of lower magnets 38 and an internally-toothed transmission wheel 29, cooperates with a downstream disconnecting mechanism 700 for blocking or driving an offset wheel 72, which is offset, along an axis D2, relative to the common axis D of rotation of the control bezel 20 and display bezel 10: this offset wheel 72 is guided between a plate 60 and a bridge 71 fastened to this plate 60. A pinion 73 comprises at least one trunnion 75 which is movable in an oblong aperture 76 in this bridge 71, between extreme stop positions 76A and 76B. This pinion 73 cooperates with the toothed transmission wheel 29, and tends to be returned towards the offset wheel by a strip spring 74 embedded in a setting 77 in the plate 60, this spring 74 comprising a finger cooperating with the pinion 73 to hold it in an angular position about its axis of rotation D3, the position of which is movable along an arc of a circle. This pinion 73 is shown in FIGS. 10 and 11, with its trunnion 75 in abutment on the end 76A of the oblong groove 76, in the position in which it is engaged with the offset wheel 72, which itself controls another function inside the watch. FIG. 12 shows the pinion 73 with its trunnion 75 in abutment on the other end 76B of the oblong groove 76, in the position in which it is disengaged from the offset wheel 72.

As can be seen in FIG. 11, when the movable member 30 rotates in the second direction S2, the pinion 73 rotates in the direction S4, which is equivalent to the second direction, and the offset wheel, which is thus driven, rotates in the direction S3, which is equivalent to the first direction. FIG. 12 shows the opposite case to that of FIG. 11, and the disengagement between the pinion 73 and the offset wheel 72; when the movable member 30 rotates in the first direction S1, the pinion 73 rotates in the direction S5, which is equivalent to the first direction, and moves away from the offset wheel via the movement A, and thus the offset wheel 72, which is not driven, remains stationary.

In an alternative embodiment, water-resistance can be complemented by at least one external seal 59 arranged between the middle 50 and the control bezel 20.

More particularly, in the alternative embodiments illustrated in FIGS. 1 to 12, the movable member 30 is an inner ring coaxial with the control bezel 20 and with the display bezel 10 along the axis of rotation D.

More specifically, the first direction of rotation is anticlockwise relative to the middle 50, as seen by the user from the display side.

In particular, the watch 100 is a diving watch.

In short, the invention makes it possible to control, on the one hand, a display bezel and, on the other hand, at least one internal component of the watch, which are located in watertight compartments, while avoiding the watertightness problems that are difficult to overcome with push-buttons or control crowns. Moreover, operation via a control bezel allows the watch to be used in complete safety in difficult conditions, such as in an aquatic environment, or when the user has to wear gloves or a special suit to work in a protected or hazardous environment.

The invention claimed is:

1. A watch (100) comprising a middle (50) carrying a display bezel (10) and a control bezel (20) coaxial with the display bezel (10) and accessible to a user for operation, the control bezel (20) being rotatable in a first direction of rotation and in the second direction of rotation opposite to the first direction of rotation, and being arranged so as to be able to drive the display bezel (10) solely in said first direction of rotation, via a one-way drive mechanism of the display bezel, under the action of a rotational motion imparted by a user to the control bezel (20) in the first direction of rotation, the watch further comprising another movable member in addition to the display bezel, and the control bezel (20) being arranged to be able to drive said movable member (30) under the action of a rotational motion imparted by a user to the control bezel (20) in the second direction of rotation.

2. The watch (100) according to claim 1, wherein the display bezel is arranged so as to be rotatable only in said first direction of rotation relative to said middle (50) by means of a first click mechanism arranged between said middle and the display bezel.

3. The watch (100) according to claim 1, wherein said one-way drive mechanism for the display bezel is formed by a second click mechanism.

4. The watch (100) according to claim 1, wherein the movable member (30) is housed inside the middle (50) and protected sealingly by the middle (50).

5. The watch (100) according to claim 4, wherein the control bezel (20) is arranged to drive the movable member (30) by means of contactless transmission means formed by magnetic transmission means, the control bezel (20) or the movable member (30) comprising magnets arranged to cooperate with magnets or at least one ferromagnetic mass comprised in the movable member or respectively the control bezel (20), so as to allow the movable member to be driven in a contactless manner by the control bezel by way of the middle.

6. The watch (100) according to claim 5, wherein the movable member (30) comprises internal magnets (38) which are separated by the middle (50) from at least one external ferromagnetic mass or external magnets (28) comprised in the control bezel.

7. The watch (100) according to claim 5, wherein said movable member (30) is arranged so that it can rotate; and in that the internal magnets (38), on the one hand, and the external magnets (28) or the at least one external ferromagnetic mass, on the other hand, are arranged in two rings that are substantially coplanar and concentric relative to a common axis of rotation (D) about which the control bezel (20) and the movable member (30) can rotate.

8. The watch (100) according to claim 5, wherein said movable member (30) is arranged so that it can rotate; and in that the internal magnets (38), on the one hand, and the external magnets (28) or the at least one external ferromagnetic mass, on the other hand, are arranged in two rings that are parallel and stacked in the direction of a common axis of rotation (D) about which the control bezel (20) and the movable member (30) can rotate.

9. The watch (100) according to claim 5, wherein said control bezel (20) comprises at least one ferromagnetic mass in the form of a toothed ring, the number of teeth of which is equal to a number of magnetic pitches that said movable member (30) comprises, or to an integer multiple of this number of pitches.

10. The watch (100) according to claim 5, wherein the watch is arranged so that the control bezel (20) can drive said movable member (30) solely by said rotational motion in said second direction of rotation.

11. The watch according to claim 10, wherein the watch comprises a third click mechanism arranged between said movable member and a part integral with the middle, or the middle, so as to prevent the movable member (30) from being driven during a rotational motion of the control bezel (20) in said first direction of rotation.

12. The watch (100) according to claim 1, wherein the control bezel (20) is arranged to drive the movable member (30) by means of one-way mechanical transmission means, which comprise either a click mechanism or an upstream disconnectable mechanism (70) arranged upstream of the movable member (30) so as to allow this movable member to be driven solely by said rotational motion of the control bezel in said second direction of rotation.

13. The watch (100) according to claim 12, wherein the control bezel (20), which rotates about an axis of rotation (D), comprises, coaxially, an internally-toothed transmission wheel (29) which is arranged to drive the movable member (30) by means of an upstream disconnectable mechanism (70) arranged for the one-way driving of an offset wheel (72), which constitutes or drives the movable member (30) and which is offset relative to the axis of rotation (D), under the action of a pinion (73), also offset relative to the axis of rotation (D) and permanently engaging with the internally-toothed transmission wheel (29) and held guided in an oblong groove (76) made in a fixed bridge (71), which oblong groove is coaxial with the axis of rotation (D), between extreme stop positions (76A; 76B), the pinion (73) being arranged to engage with the offset wheel (72) when the control bezel (20) rotates in the second direction of rotation, and to disengage from the offset wheel (72) when the control bezel (20) rotates in the first direction of rotation.

14. The watch (100) according to claim 1, wherein said movable member (30) is a ring inside the middle and coaxial with said control bezel (20) and with said display bezel (10).

15. The watch (100) according to claim 2, wherein said display bezel (10) comprises a notching or a click, arranged to cooperate respectively with a click or a notching carried by or comprised in said middle (50), which notching and click constitute said first click mechanism, and are combined and arranged together to prevent rotation of said display bezel (10) in said second single direction of rotation.

16. The watch (100) according to claim 3, wherein said control bezel (20) comprises a notching or a click arranged to cooperate respectively with a click or a notching comprised in said display bezel (10), which notching and click constitute said second click mechanism, and are combined and arranged together to impose a single driving direction for said display bezel (10) by said control bezel (20).

17. The watch (100) according to claim 1, wherein the control bezel (20) is arranged to drive the movable member (30) by means of two-way mechanical transmission means; and in that said movable member (30), arranged so as to be able to rotate about an axis of rotation (D), is arranged so as to be able to operate and/or control a downstream mechanical device, located downstream of said movable member (30) in said watch (100), via a downstream disconnectable mechanism (700) or a downstream click mechanism which is arranged so that the movable member can operate and/or control said downstream mechanical device solely by said rotational motion imparted by a user to the control bezel (20) in said second direction of rotation.

18. The watch (100) according to claim 5, wherein said movable member (30), arranged so as to be able to rotate about an axis of rotation (D), is arranged so as to be able to operate and/or control a downstream mechanical device, located downstream of said movable member (30) in said watch (100), via a downstream disconnectable mechanism (700) or a downstream click mechanism which is arranged so that the movable member can operate and/or control said downstream mechanical device solely by said rotational motion imparted by a user to the control bezel (20) in said second direction of rotation.

19. The watch (100) according to claim 17, wherein said downstream mechanical device is arranged to be operated and/or controlled by said movable member (30), which comprises an internally-toothed transmission wheel (29), via the downstream disconnectable mechanism (700) which comprises a wheel (72) and a pinion (73), both offset relative to the axis of rotation (D), the pinion permanently engaging with the internally-toothed transmission wheel and being held guided in an oblong groove (76) comprised in a fixed bridge (71), which oblong groove is coaxial with the axis of rotation (D), between extreme stop positions (76A; 76B), the pinion (73) being arranged to engage with the offset wheel (72) when the control bezel (20) rotates in the second direction of rotation, and to disengage from the offset wheel when the control bezel rotates in the first direction of rotation.

20. The watch (100) according to claim 1, wherein said control bezel (20) is externally coaxial with said display bezel (10) and is arranged to laterally protect said display bezel (10).

* * * * *